Feb. 22, 1966  B. P. L. AMIET ETAL  3,236,697
DEFERRED-ACTION BATTERY
Filed Oct. 12, 1961  3 Sheets-Sheet 1

INVENTORS:
BERNARD PAUL LOUIS AMIET
PIERRE LANGELLA
BY
Irving Holtzman
ATTORNEY

Feb. 22, 1966  B. P. L. AMIET ETAL  3,236,697
DEFERRED-ACTION BATTERY
Filed Oct. 12, 1961  3 Sheets-Sheet 2

INVENTORS:
BERNARD PAUL LOUIS AMIET
PIERRE LANGELLA
BY
ATTORNEY

Patented Feb. 22, 1966

3,236,697
DEFERRED-ACTION BATTERY
Bernard Paul Louis Amiet, Ville d'Avray, and Pierre Langella, Horly le Roi, France, assignors to Yardney International Corp., New York, N.Y., a corporation of New York
Filed Oct. 12, 1961, Ser. No. 144,641
Claims priority, application France, Oct. 12, 1960, 840,965, Patent 78,517
8 Claims. (Cl. 136—162)

This invention relates to electric batteries. More particularly, the invention relates to batteries of the deferred-action type that are in a charged, dry state and subsequently activated by the introduction of liquid electrolyte into the casing containing the electrode assembly.

Deferred-action-type batteries are useful under conditions requiring prolonged storage in a charged state since the absence of electrolyte during storage will effectively prevent any premature loss of charge and will also protect the inter-electrode separators from chemical attack and consequent early deterioration. Although such batteries can be used without preliminary on-the-spot charging, a certain delay is always necessary to allow for the activation of the battery, i.e. the permeation of the electrode assembly by the electrolyte. Furthermore, the activation mechanism must be reliable as well as rapid in operation in order to assume fast even metering of the electrolyte into the casing containing the electrode assembly and, consequently quick activation.

It is, therefore, a primary object of the invention to provide a dry-charged battery with improved means for activating the same.

It is another object of the invention to provide a dry-charged battery and means for activation which are simple in construction but reliable and rapid in operation.

It is also an object of the present invention to provide a deferred-action battery as described above wherein provision is made for the transport of electrolyte from electrolyte reservoir to electrode chamber utilizing a minimum of space for this purpose.

Another object of the present invention is to furnish an activatable electrochemical generator which works under optimum conditions of safety.

It is another object of the invention to furnish such a device of the above-mentioned type which can be used at relatively high temperatures.

It is still another object of the invention to furnish such an apparatus which is practically insensible to the effects of vibration and shock.

Other objects and advantages of the invention will be apparent from the following description, reference being made to the accompanying drawing in which.

Figure 12:
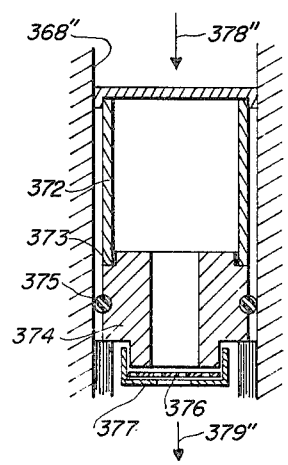

FIG. 12 also is a schematic view in section of another embodiment of this invention.

As mentioned above, among the objects of the present invention is the provision of an activatable battery which may withstand high temperatures e.g. of the order of 50° C. and more, as well as vibration and shock. To this end, in accordance with this invention, the electrolyte reservoirs described in more detail below may be made of high or low pressure polyethylene, nylon, Rilsan, Kel-f, Makrolon, etc. The electrolyte reservoirs may also be made of flexible metals. Where the material used in the reservoir can be corroded by the potassium hydroxide electrolyte, this corrosion may be avoided by coating the reservoir material with a layer of metallic material or with a layer of alkali resistant plastic material such as one of the Araldites. Because of its availability in different viscous states, this material may be used to easily coat non-accessible surfaces.

Another feature of the present invention provides the electrolyte reservoir with a perforatable membrane also described in more detail below which is coated on one or both of its sides with a plastic or metallic layer. This may be accomplished, for example, by metallizing the membrane in vacuum or by spraying. This coating improves the sealing of the electrolyte reservoir and is particularly important when the battery is being subjected to high vibration and/or thermal shock.

Still another facet of the invention is the reliability of the activating device. This reliability is present even when the materials chosen for the construction of the membrane or cap of the electrolyte container described infra have characteristics which render them less easily rupturable.

Figure 1:
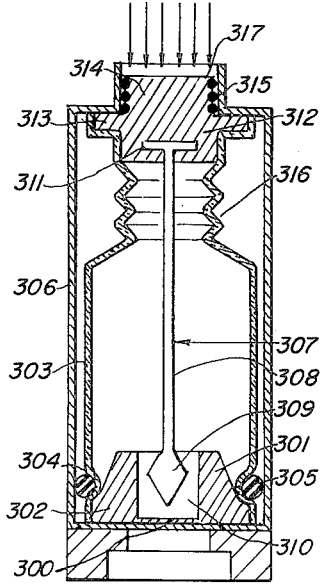
FIG. 1 is a cross-sectional schematic view of a battery-actuating mechanism according to this invention showing the electrolyte compartment with the activating mechanism in distended condition.
Figure 2:
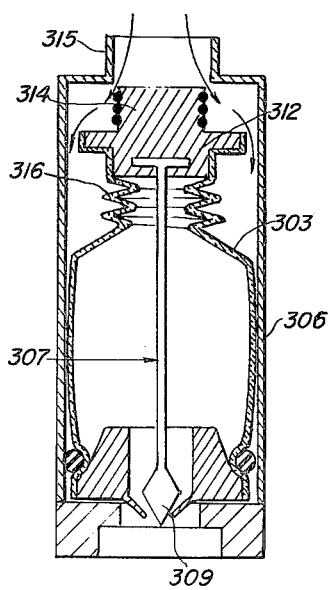
FIG. 2 is a view similar to FIG. 1 showing the activating mechanism in compressed position.

Referring now to FIGS. 1 and 2, the membrane 300 forms the base of a lower cap 301, which also has a shoulder 302 for mounting it in the electrolyte-containing mouth of the bottle 303. Bottle 303 is generally of cylindrical shape, and presents, for the purpose of mounting the cap 301, an internal groove 304 advantageously semi-circular in profile. Groove 304 receives a sealing ring 305 which cooperates with the cylinder 306 in which the bottle 303 is lodged. The bottle 303 contains on its inside, piercing means 307 which is made of a rod 308 having a free pointed extremity 309 extending into a cavity 310 provided in the cap 301. The other extremity 311 of the rod 308 is fixed in an upper cap 312 which closes the other extremity of the bottle and which is provided with a shoulder 313. The upper cap 312 is lengthened by a cylindrical element 314 mounted in a tight sliding fashion in a bore 315 coaxial with cylinder 306. The profile of the element 314 allows the lodgment of one or more tight packings. The bottle 303 is constructed in a manner which allows it to collapse easily. In the embodiment shown in FIGS. 1 and 2, it is shown as comprising a container whose walls are partly formed as accordion section 316.

Figure 10:
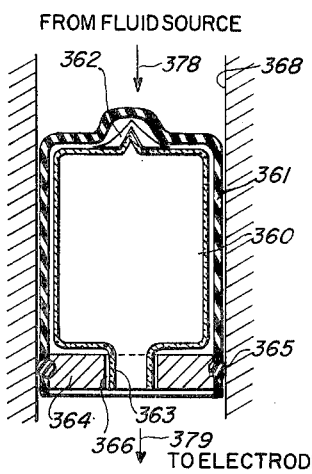
FIG. 10 is a cross-sectional schematic view of still another embodiment in this invention.

To activate this battery, the pressure is applied on face 317 of the piston 314, as shown by the arrows. As a consequence of the easy collapse of the wall of the bottle 303, the activating member 307 is moved against the frangible membrane 300 and the point 309 breaks the latter; as shown in FIG. 10. The effect of the pressure deforms then the body of the bottle and the liquid which is contained in it is expelled through the opening left free by the rupture of membrane 300, which allows for the activation of the battery or batteries.

Figure 3:
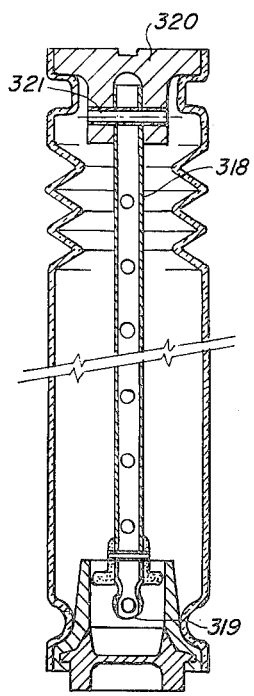
FIG. 3 is a schematic longitudinal sectional view of another embodiment of this invention.

In the embodiment shown in FIG. 3, the rod 318 has the piercing point 319 mounted on the cap 320 by means of a pivotal pin 321.

Figure 4:
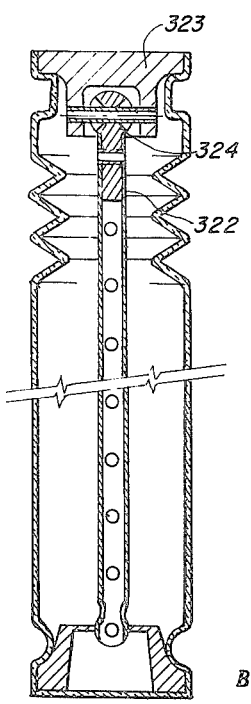
FIG. 4 is a schematic view similar to FIG. 3 of another modification of this invention.

In a variation, as shown in FIG. 4, the rod 322 is mounted on the cap 323 by means of a swivel joint 324.

Figure 5:
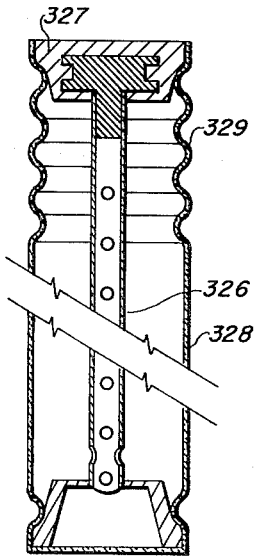
FIG. 5 is a schematic view similar to FIGS. 3 and 4 of still another modification of this invention.

In the arrangement of FIG. 5, the rod 326 is firmly connected to the cap 327. At its most collapsible portion, the bottle 328 is corrugated in profile as shown in 329, and is constituted by a succession of semicircular parts. These parts can be used for the lodgment of tight rings.

Figure 6:
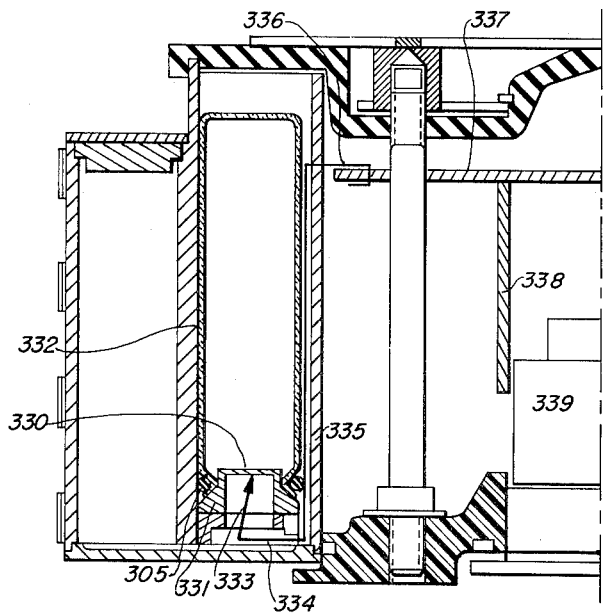
FIG. 6 is a partial longitudinal sectional view of an activatable battery of this invention, with some of the members being omitted.

In the embodiment shown in FIG. 6, the breakable member 330, being part of a cap 331 which closes a bottle 332, is adjacent point 333 which forms the extremity of the rod or wire 334 (for example "a piano wire"), made in such a way that it passes between said bottle 332 and wall 335. Wire 334 is supported by means of a member 336 on the roof 337 of a cover 338 slidably mounted on top of the impeller 339. When the latter is fired, the pressure which is developed pushes the cap 338 and the point 333 upwardly and preferably in an oblique fashion to pierce the membrane 330. A plurality of wires 334 can be provided which are regularly spaced from each other and secured to base 337 in an angular fashion as shown in FIG. 6 each of which carries a point 333 which simultaneously pierces a membrane 330.

The sealing of the bottle 332 in relation to the wall 335 is effected with the help of a packing member 305, through which the wire 334 passes.

Figure 7:
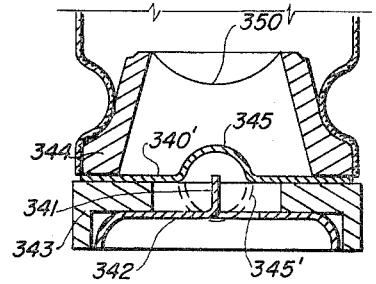
FIG. 7 is an enlarged cross-sectional view of the extremity of an electrolyte container embodied in this invention.

In the embodiment shown in FIG. 7, piercing point 341 projects upwardly from the base of a disc 342 which fits the valve 343. The latter seals, in cooperation with the cap 344, the periphery of membrane 340'. Point 341 is placed adjacent the central part 345 of the membrane which is constructed in the shape of a hemispherical shell whose convex side is initially turned toward the bottle, as shown in solid line. On increasing the pressure within the bottle, the incurved part 345 suddenly takes the position shown in dotted line 345', meets the point 341, and breaks.

As a variation, the valve 343 and the cap 344 are made of one piece, and the member 345 is molded into this piece. The thin member 350, shown in FIG. 6, which is easily breakable, is optional.

Figure 8:
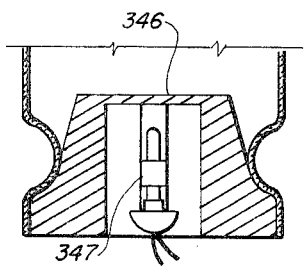
FIG. 8 is a cross-sectional schematic view of the extremity of an electrolyte container for another form of the invention.

The modification shown in FIG. 8 is to be used in systems which allow the compression of electrolyte containers. To a frangible membrane 346, is joined thermal device 347, which may comprise a powder charge, which, when ignited, creates an elevation of temperature which causes the rupture of the membrane.

In another manner, the rupture is created not only by thermal effects, but also by shock waves caused by either the explosion of a powder charge, or by the projection of a striking agent, resulting by the combustion of the powder.

Figure 9:
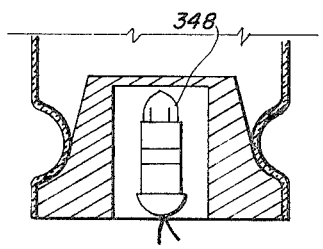
FIG. 9 is a view similar to FIG. 8 of another embodiment of this invention.

In the embodiment shown in FIG. 9, a very high degree of heat is applied to the wire 348 until it becomes red, allowing the easy rupture of the membrane.

In the device shown in FIG. 10, the electrolyte is contained in a bottle 360. The latter is made of breakable glass, for example tempered glass, and is covered by a pliable wrapper 361. For example, the wrapper could be made of rubber, the wrapping being effected by dipping bottle 361 in a solution of latex. A protective tip 362 is provided for bottle 360 and the neck 363 of the bottle is maintained in a collar 364 which is also used to receive packing 365.

In the operation of this embodiment, the compression waves assure the rupture of the bottle into little pieces, and the rubber envelope pushes the liquid back through the central opening 366 of the collar 364, the packing 365 preventing the escape of the fluid around the envelope. Said envelope is in contact with the electrolyte only during activation.

Figure 11:
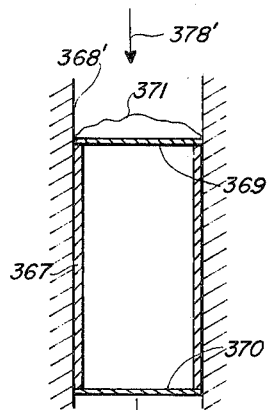
FIG. 11 is a schematic view in section of another device included in this invention.

In the device shown in FIG. 11, the container holds a cylindrical body 367 which is rigid and not easily breakable. Said body is lodged in the electrolyte compartment 368. The cylindrical body is sealed at each one of its extremities by a small plate or by a breakable membrane, e.g. 369 and 370. Said members can be glued on the sections of the cylindrical body. For certain cases these membranes can be coated with a layer which protects them from the action of the electrolyte contained in the cylindrical body. The membranes may be secured with the help of rings which are screwed into position or some analogous device.

The breakable small plate 369 is surmounted by an elastic member 371. The latter, loose before the arrival of the pressurized fluid, is introduced by the said fluid into the body 367 after the breakage of the small plate 369. This pushes the electrolyte toward the electrode compartments, the small plate 370 having been broken at the time of the arrival of the pressure wave.

In the embodiment illustrated in FIG. 12, the electrolyte is contained in a container 372 which is made of a metal thin enough to be pliable, copper, for example, annealed or not, or of silver, cold rolled or not, or of another appropriate metal for this purpose. Container 372 is cylindrical in shape or in the shape of a tube usually used to hold a pasty material, and is open at one of its ends 373. Said extremity 373 is soldered, brazed or glued on to a cap 374, made of metal for example, which has a tight fitting packing 375. Cap 374 is closed by a perforated membrane 376 which can be made of different materials. For this purpose a very thin metal, like gold for instance, can be used. The membrane 376 is glued or soldered or brazed on the cap 374. It can be kept in place with the help of a screwed cap 377, with or without a packing.

The internal protection of the bottle, its cap, and also of the membrane may be treated by nickel plating or some similar expedient.

It will be readily apparent to those skilled in the art, that the electrolyte containers described above may be used with electrode compartments containing various types of electrodes. For example one particularly good system, is a silver-zinc couple in which the electrolyte employed is potassium hydroxide. Furthermore, in a cell containing silver and zinc electrodes or any other type of electrodes, there is generally employed separating membranes. These membranes can be made of nylon, cellulosic material, paper, or some other type of material and usually are placed between the electrodes separating one from the other and thereby preventing short circuits within the cell itself.

A deferred-action battery manufactured in accordance with the present invention presents numerous advantages. For example reliable and rapid activation of a battery is achieved when the construction of this invention is employed. Furthermore, the activating mechanism disclosed and claimed herein is simple in construction and has a relatively small number of moving parts thereby minimizing the risks of malfunctioning due to accidental breakdown of the components. In addition, the battery of this invention may be subjected to severe vibration and handling without great risks of improper operation.

Numerous modifications and embodiments of this invention can be made without departing from the spirit and scope thereof and it is to be understood that the invention is not to be limited except as defined in the appended claims.

What is claimed is:

1. In an electrolyte-supply system for a deferred-action battery, in combination, a generally cylindrical electrolyte-containing vessel having a pair of axially spaced extremities, outlet means at one of said extremities for conveying electrolyte to a battery, a frangible diaphragm extending generally transversely to the axis of said vessel and spanning said outlet means, the other end of said vessel being displaceable axially toward said diaphragm to force electrolyte out of said vessel through said outlet means, and an elongated piercing member extending generally axially within said vessel and joined at one end to said other extremity for displacement thereby into engagement with said diaphragm for rupturing same upon said displacement of said other extremity toward said diaphragm.

2. In an electrolyte-supply system for a deferred-action battery, in combination, a generally cylindrical electrolyte-containing vessel provided with a wide mouth at one axial extremity thereof and formed with a deformable wall at the other axial extremity, outlet-forming means at said one of said extremities substantially completely filling said mouth and having a passage for conveying electrolyte to a battery, a frangible diaphragm mounted on said outlet-forming means and extending generally transversely to the axis of said vessel while spanning said passage, said other end of said vessel being displaceable axially toward said diaphragm to force electrolyte out of said vessel through said outlet means, and an elongated piercing member extending generally axially within said vessel and joined at one end to said other extremity for displacement thereby into engagement with said diaphragm for rupturing same upon said displacement of said other extremity toward said diaphragm.

3. In an electrolyte-supply system for a deferred-action battery, in combination, a generally cylindrical electrolyte-containing vessel provided wtih a wide mouth at one axial extremity thereof and formed with a deformable wall at the other axial extremity, outlet-forming means at said one of said extremities substantially completely filling said mouth and having a passage for conveying electrolyte to a battery, a frangible diaphragm integral with said outlet-forming means and extending generally transversely to the axis of said vessel while spanning said passage, said other end of said vessel being displaceable axially toward said diaphragm to force electrolyte out of said vessel through said outlet means, and an elongated piercing member extending generally axially within said vessel and joined at one end to said other extremity for displacement thereby into engagement with said diaphragm for rupturing same upon said displacement of said other extremity toward said diaphragm.

4. In an electrolyte-supply system for a deferred-action battery, in combination, a generally cylindrical electrolyte-containing vessel having a pair of axially spaced extremities, outlet-means at one of said extremities for conveying electrolyte to a battery, a frangible diaphragm extending generally transversely to the axis of said vessel and spanning said outlet means, the other end of said vessel being displaceable axially toward said diaphragm to force electrolyte out of said vessel through said outlet means, and an elongated piercing member extending generally axially within said vessel, said member being joined at one end to said other extremity and having a pointed end remote from said other extremity but juxtaposed with said diaphragm for displacement by said other extremity into engagement with said diaphragm for rupturing same upon said displacement of said other extremity toward said diaphragm.

5. In an electrolyte-supply system for a deferred-action battery, in combination, a generally cylindrical electrolyte-containing vessel provided with a wide mouth at one axial extremity thereof and formed with a deformable wall at the other axial extremity, outlet-forming means at said one of said extremities substantially completely filling said mouth and having a passage for conveying electrolyte to a battery, a frangible diaphragm integral with said outlet-forming means and extending generally transversely to the axis of said vessel while spanning said passage, said other end of said vessel being displaceable axially toward said diaphragm to force electrolyte out of said vessel through said outlet means, and an elongated piercing member extending generally axially within said vessel, said member being joined at one end to said other extremity and having a pointed end remote from said other extremity but juxtaposed with said diaphragm for displacement by said other extremity into engagement with said diaphragm for rupturing same upon said displacement of said other extremity toward said diaphragm.

6. In an electrolyte-dispensing system for a deferred-action battery, in combination, an electrolyte-containing vessel having an outlet for discharging electrolyte into a battery and at least one frangible wall portion adapted to rupture under pressure, and a flexible layer overlying said wall portion for entry into said vessel upon rupture of said wall portion to force electrolyte out of said vessel through said outlet under pressure externally appplied to said layer.

7. In an electrolyte-dispensing system for a deferred-action battery, in combination, an electrolyte-containing vessel having an outlet for discharging electrolyte into a battery and at least one frangible wall portion remote from said outlet and adapted to rupture under pressure, and a flexible layer overlying said wall portion for entry into said vessel upon rupture of said wall portion to force electrolyte out of said vessel through said outlet under pressure externally applied to said layer.

8. In an electrolyte-dispensing system for a deferred-action battery, in combination, an electrolyte-containing vessel having an outlet for discharging electrolyte into a battery and a generally cylindrical frangible wall portion adapted to rupture under pressure, and a flexible receptacle surrounding said vessel overlying said wall portion for entry into the space occupied thereby upon rupture of said wall portion to force electrolyte from said vessel through said outlet under pressure externally applied to said flexible layer.

References Cited by the Examiner
UNITED STATES PATENTS

| | | | |
|---|---|---|---|
| 2,603,857 | 7/1952 | Hanby | 30—4 |
| 2,826,627 | 3/1958 | Aldrich. | |
| 2,851,510 | 9/1958 | Pauli | 136—90 |
| 2,852,592 | 9/1958 | Saluze | 136—90 |
| 2,896,067 | 7/1959 | Lockwood | 136—90 |
| 2,918,514 | 12/1959 | Everett | 136—162 |
| 2,918,515 | 12/1959 | Lawson | 136—162 |
| 2,937,220 | 5/1960 | Bauman | 136—90 |
| 3,005,863 | 10/1961 | Floyd et al. | 136—90 |

WINSTON A. DOUGLAS, *Primary Examiner.*

JOHN R. SPECK, JOSEPH REBOLD, MURRAY TILLMAN, *Examiners.*